(12) United States Patent
Ayle

(10) Patent No.: US 8,733,500 B1
(45) Date of Patent: May 27, 2014

(54) ACOUSTIC STRUCTURE WITH INTERNAL THERMAL REGULATORS

(71) Applicant: Hexcel Corporation, Dublin, CA (US)

(72) Inventor: Earl Ayle, Chandler, AZ (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 13/674,523

(22) Filed: Nov. 12, 2012

(51) Int. Cl.
*E04B 1/82* (2006.01)

(52) U.S. Cl.
USPC ............................................ 181/292; 181/284

(58) Field of Classification Search
USPC ................................................ 181/292, 284
See application file for complete search history.

(56) References Cited

U.S. PATENT DOCUMENTS

| | | | |
|---|---|---|---|
| 4,265,955 A | 5/1981 | Harp et al. | |
| 4,336,292 A * | 6/1982 | Blair | 428/116 |
| 4,767,656 A | 8/1988 | Chee et al. | |
| 4,849,276 A * | 7/1989 | Bendig et al. | 428/117 |
| 5,000,998 A | 3/1991 | Bendig et al. | |
| 5,041,321 A | 8/1991 | Bendig | |
| 5,198,282 A | 3/1993 | Baker et al. | |
| 5,376,598 A | 12/1994 | Preedy et al. | |
| 5,445,861 A | 8/1995 | Newton et al. | |
| 6,220,388 B1 * | 4/2001 | Sanborn | 181/290 |
| 7,434,659 B2 | 10/2008 | Ayle | |
| 7,510,052 B2 * | 3/2009 | Ayle | 181/292 |
| 7,854,298 B2 * | 12/2010 | Ayle | 181/292 |
| 8,327,976 B2 * | 12/2012 | Muller et al. | 181/290 |
| 8,397,865 B2 * | 3/2013 | Douglas et al. | 181/292 |
| 2005/0074593 A1 * | 4/2005 | Day et al. | 428/292.1 |
| 2006/0102419 A1 * | 5/2006 | Mitchell et al. | 181/200 |
| 2012/0082808 A1 * | 4/2012 | Lemains et al. | 428/34.1 |
| 2012/0107611 A1 | 5/2012 | Yang et al. | |

* cited by examiner

*Primary Examiner* — Forrest M Phillips
(74) *Attorney, Agent, or Firm* — W. Mark Bielawski; David J. Oldenkamp

(57) ABSTRACT

Thermally insulating septums are located internally within the cells of an acoustic honeycomb to regulate heat flow into the acoustic structure. The internally located insulating septums protect the honeycomb and acoustic septums located within the honeycomb cells from heat damage that might otherwise be caused by a heat source, such as the hot section of a jet engine. The internal thermal regulators are useful in combination with heat blankets or other thermal insulating structures to provide a reduction in size and/or weight of the insulating structure while still providing the same overall degree of thermal insulation for the acoustic honeycomb.

20 Claims, 3 Drawing Sheets

ACOUSTIC STRUCTURE WITH INTERNAL THERMAL REGULATORS

BACKGROUND OF THE INVENTION

1. Field of the Invention

The present invention relates generally to acoustic structures that are used to attenuate or dampen noise that emanates from a particular source. More particularly, the present invention is directed to acoustic structures that are exposed to relatively high temperatures and the systems that are used to protect such acoustic structures from damage that might be caused by such heat exposure.

2. Description of Related Art

It is widely recognized that the best way of dealing with noise generated by a specific source is to treat the noise at the source. This is typically accomplished by adding acoustic damping structures to the structure of the noise source. One particularly problematic noise source is the jet engine used on most passenger aircraft. Acoustic structures are typically incorporated in the engine inlet, nacelle and combustion/exhaust structures. These acoustic structures include acoustic resonators that contain relatively thin acoustic materials or grids that have millions of holes that create acoustic impedance to the sound energy generated by the engine.

Honeycomb has been a popular material for use in aircraft and aerospace vehicles because it is relatively strong and lightweight. For acoustic applications, acoustic materials are added to the honeycomb structure so that the honeycomb cells are acoustically closed at the end located away from the noise being dampened and covered with a porous covering at the end located closest to the noise. The closing of the honeycomb cells with acoustic material in this manner creates an acoustic resonator that provides attenuation, damping or suppression of the noise. Acoustic septums are also usually located within the interior of the honeycomb cells in order to provide the resonator with additional noise attenuation properties.

Large jet engines include a combustion or hot section that is located centrally within the engine. The hot section produces large amounts of hot combustion gases. The hot section is surrounded by an annular passageway through which air flows at much colder temperatures. The hot sections of present day jet engines typically operate at temperatures on the order of 500° F. to 750° F. The next generation of jet engines is being designed to have hot sections that operate at higher temperatures which are expected to be as high as 900° F. The higher hot section operating temperature is necessary in order to produce lower emissions and to achieve greater fuel economy.

Acoustic structures that are located near the hot sections must be protected against the relatively high temperatures in order to avoid damage to the honeycomb and/or acoustic septums. This is a particular problem for acoustic honeycomb made from composite materials which utilize matrix resins that have maximum operating temperatures on the order of 350° F. to 500° F. depending upon the type of resin. The material used to make the acoustic septum may also be damaged when exposed directly to the heat generated by the hot section.

One current approach that is used to protect acoustic structures from heat generated by the hot section is to place an insulating structure, such as a heat blanket between the hot section and the acoustic structure being protected. The heat blanket reduces the flow of heat into the acoustic structure to provide the required thermal protection. Although heat blankets provide adequate thermal insulation, they also take up valuable space and add weight to the engine. In addition, the service life of a typical heat blanket is limited so that it must be replaced at specified time intervals. The thermal blanket must also be removed to allow inspection of underlying structures. This removal and reinstallation process is time consuming and many times results in the heat blanket being damaged. Repairing and/or replacing a damaged heat blanket can involve significant added time and costs.

Another approach used to thermally protect acoustic structures is to coat the high temperature side of the acoustic structure with high temperature silicone. Such high temperature silicone coatings provide adequate thermal protection. However, the insulating coatings must be scrapped and peeled off in order to inspect the underlying acoustic structure. This is a time consuming process that also destroys the coating. A new coating must be applied to the acoustic structure once the inspection has been completed. Application of a new silicone coating is a time consuming process that includes the additional cost of the new high temperature silicone coating material.

There presently is a need to design thermal protection systems for acoustic structures that are more efficient, smaller than and not as heavy as existing thermal protection systems. The need is especially great for acoustic structures that will be used in the next generation of large jet engines where even higher hot section operating temperatures are expected.

SUMMARY OF THE INVENTION

In accordance with the present invention, it was discovered that thermally insulating septums can be located internally with the acoustic honeycomb to regulate heat flow into the acoustic structure and provide an effective thermal insulation system that protects the honeycomb and acoustic septums from heat damage that might otherwise be caused by a heat source, such as the hot section of a jet engine. The internal thermal regulators may be used alone or in combination with heat blankets or other external thermal insulating structures depending upon the temperatures to which the acoustic honeycomb is exposed.

The present invention is directed to acoustic structures, in general, and to acoustic honeycomb located near the hot section of a jet engine, in particular. The acoustic structures in accordance with the present invention include a honeycomb that has a first edge located closest to a high temperature area and a second edge located away from the high temperature area. The honeycomb includes a plurality of cells that are defined by walls that extend between the first and second edges of the honeycomb.

As a feature of the present invention, thermally insulating septums are located internally within the cells. The thermally insulating septums are located adjacent to the first edge of the honeycomb to function as an internal thermal regulator to control or prevent the flow of heat into the body of the honeycomb.

As a further feature of the present invention, acoustic damping material is located internally within the cells between the thermally insulating septums and the second edge of the honeycomb to provide attenuation of noise. The acoustic damping material is in the form of acoustic septums and/or a difunctional filler material. The difunctional filler material provides both sound damping and thermal insulation internally within the honeycomb cells.

The use of internally located insulating septums in accordance with the present invention provides a thermal regulator in the honeycomb which allows one to reduce or even eliminate the need for a separate heat blanket or other external thermal barrier depending upon the operating temperature of the hot section, the temperature limits of the honeycomb material and the amount of difunctional material located in the honeycomb cells.

The internalization of a portion of the heat protection system by using internal insulating septums provides a heat regulation system that has a number of design variables which may be used to achieve thermal regulation efficiencies that are not possible when using only an external heat blanket. As a result, the overall size and weight of the thermal protection system can be reduced while still maintaining the necessary degree of thermal protection for the acoustic honeycomb. This feature is particularly useful for thermally protecting acoustic structures in the next generation of jet engines where acoustic structures need to be thermally protected against higher operating temperatures while at the same time minimizing the weight and size of the thermal protection system as much as possible.

The above described and many other features and attendant advantages of the present invention will become better understood by reference to the following detailed description when taken in conjunction with the accompanying drawings.

DETAILED DESCRIPTION OF THE INVENTION

The acoustic structure of the present invention may be used for damping noise from a wide variety of noise sources where the acoustic structure is exposed on one side to elevated temperatures. The acoustic structure is well-suited for use in damping noise generated by aircraft engines and particularly the large jet engines used for commercial aircraft. The acoustic structure includes internal thermal regulators so that it may be employed, without a heat blanket or other external thermally insulating structure, at locations within current engine designs which operate at maximum temperatures on the order of the 600° F. to 750° F. A preferred acoustic structure in accordance with the present invention includes a heat blanket or other external thermally insulating structure in order to meet the increased thermal load produced by the next generation large jet engines. The next generation of large jet engines will operate in some hot sections at temperatures up to 900° F. and higher.

The following detailed description is limited to exemplary embodiments of acoustic structures located within a jet engine. The embodiments include acoustic structures both with and without external thermally insulating structures, such as heat blankets. It will be understood that the acoustic structures of the present invention may also be used in any situation where damping of noise from a noise source is desired and wherein the acoustic structure is exposed on one side to high temperatures.

Figure 1:
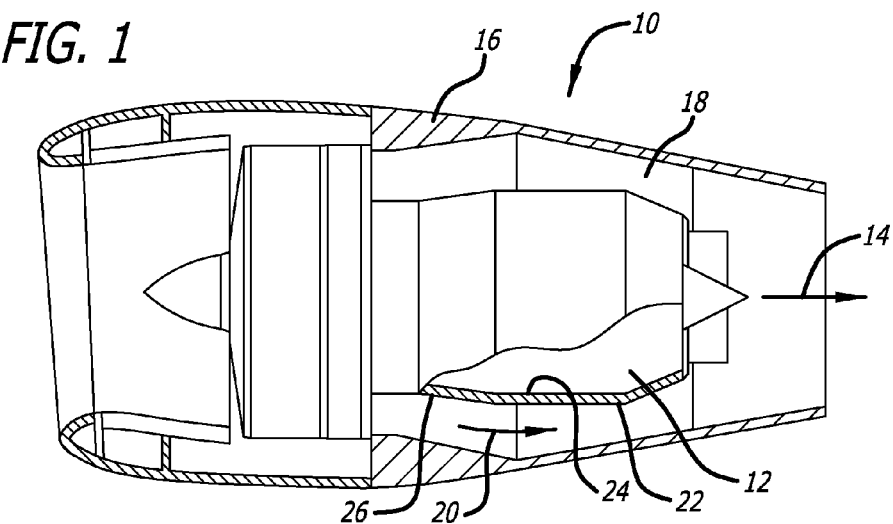
FIG. 1 shows a simplified partial cross-sectional view of a jet engine in which an acoustic structure that includes internal thermal regulators in accordance with the present invention.

An exemplary jet engine is shown at 10 in the FIG. 1. The jet engine 10 includes a combustion core or hot section 12 which generates a primary hot air flow as represented by arrow 14. The hot air flow within the hot section or high temperature area 12 can be at temperatures ranging from 600° F. to 900° F. and higher depending upon the jet engine type and design. A nacelle structure 16 is located around the hot section 12 to provide an annular duct 18 through which cold secondary air flows as represented by arrow 20. The cold air flow enters the jet engine at a temperature equal to the outside air temperature and is heated as it passes through the annular duct 18 to temperatures that are equal to or slightly less than the temperature of the hot section 12.

Figure 2:
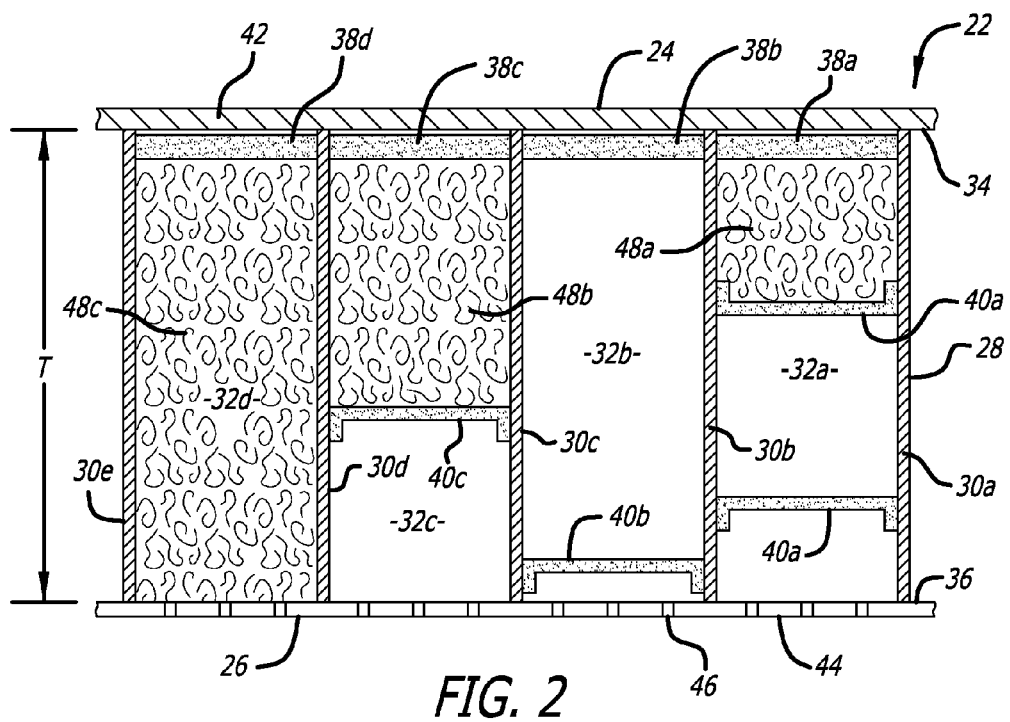
FIG. 2 is a simplified depiction of a portion of an acoustic structure that includes internal thermal regulators (insulating septums) in accordance with the present invention.

An exemplary acoustic structure in accordance with the present invention is located in the outer portion of the hot section 12 as shown at 22. The acoustic structure 22 includes a first side 24 that is located closest or adjacent to the hot section or high temperature area 12 of the jet engine. The acoustic structure 22 also includes a second side 26 that is located closest or adjacent to the cool air duct or low temperature area 18 of the jet engine. The acoustic structure 22 is shown in FIGS. 1 and 2 without a heat blanket. A heat blanket may be added, if necessary, to provide additional thermal protection. An exemplary thermal insulation system in accordance with the present invention that includes a heat blanket is described below and shown in FIG. 5.

A detailed simplified cross-sectional view of the acoustic structure 22 is shown in FIG. 2. The acoustic structure 22 includes a honeycomb 28 that includes the walls 30a-30e which define honeycomb cells 32a-32d that extend from a first edge 34 of the honeycomb to a second edge 36 of the honeycomb. As a feature of the present invention, thermally insulating septums 38a-38d are located within the honeycomb cells adjacent to the first edge 34 of the honeycomb to provide an internal thermal regulator within each cell. Acoustic septums 40a to 40c are also located within the honeycomb cells to provide desired acoustic dampening. If desired, more than one acoustic septum may be located in an individual honeycomb shell as shown in cell 32a wherein two septums 40a are located therein. A solid protective sheet 42 is attached to the first edge of the honeycomb and a perforated acoustic panel 44 is attached to the second edge of the honeycomb. If desired, difunctional material that is both insulating and sound damping may be placed within the honeycomb as shown at 48a, 48b and 48c.

Figure 3:
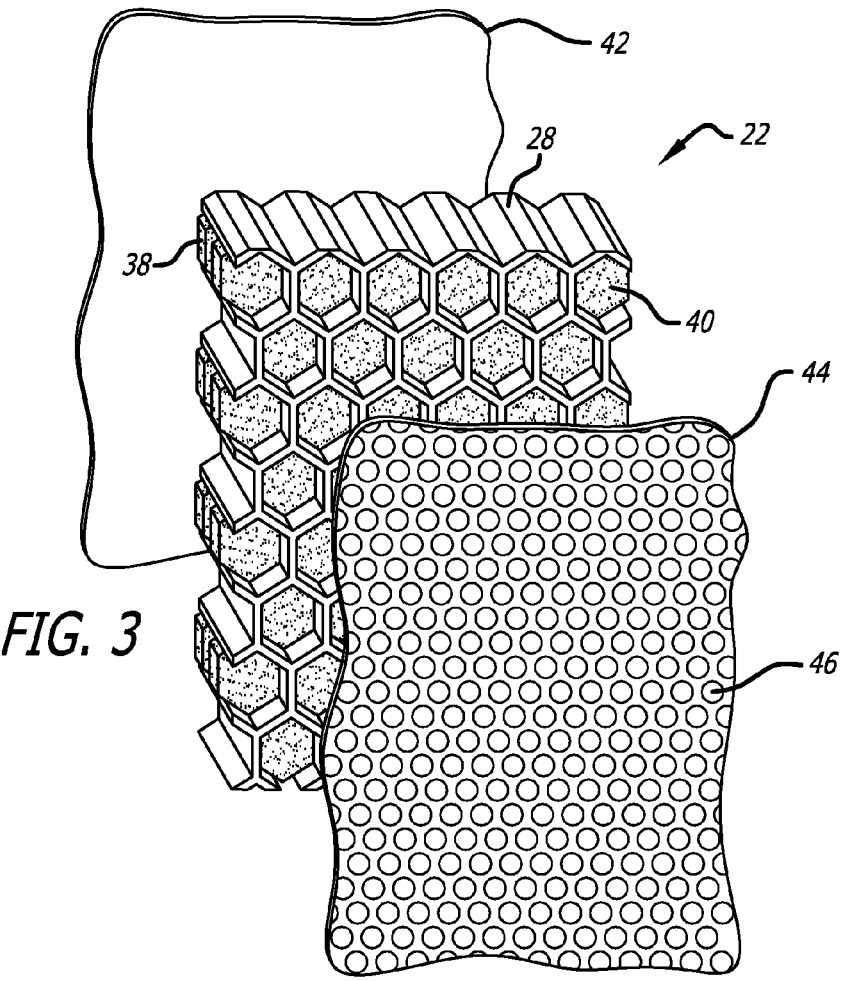
FIG. 3 is an exploded view showing the exemplary acoustic honeycomb, solid protective sheet and a perforated acoustic panel prior to their being assembled to form the exemplary acoustic structure.
Figure 4:
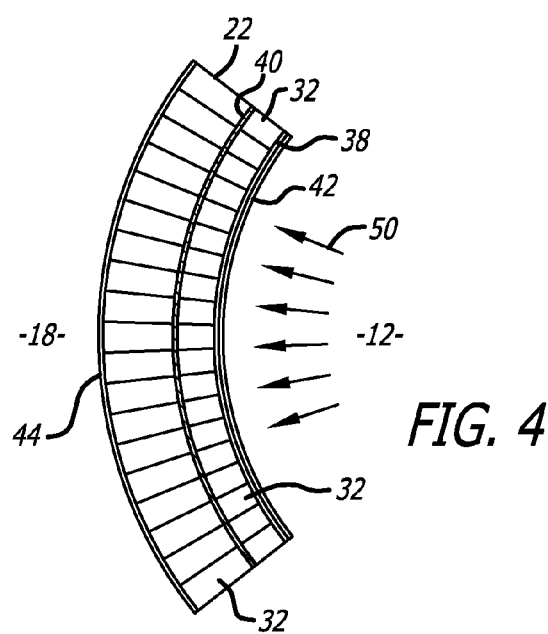
FIG. 4 is a simplified end view of FIG. 1 showing the acoustic structure located adjacent to the hot section of the jet engine.

In FIG. 3, the acoustic structure 22 is shown in prior to the solid protective sheet 42 and perforated acoustic panel 44 being attached to the edges of honeycomb 28. The thermally insulating septums are referenced as a group 38 and the acoustic septums are referenced as a group 40. The acoustic structure is shown as a planar structure in FIG. 3. The actual final structure will typically be curved, as shown in FIG. 4 to provide an annular structure that surrounds the hot section of the jet engine In FIG. 4, a simplified end view of a section of FIG. 1 is shown where arrows 50 depict the heat radiated from the hot section 12 which is regulated by the thermally insulating septums 38. The identifying numbers in FIG. 4 correspond to the identifying numbers used in FIGS. 1-3. As will be discussed below, a thermal blanket or other external heat insulating structure will optionally be located between the acoustic structure 22 and the hot section 12 to provide additional thermal insulation in those situations where the insulating septums alone cannot adequately protect a given honeycomb material from the heat generated by the hot section.

The materials used to make the honeycomb 28 can be any of those typically used in acoustic structures including metals, ceramics and composite materials. Exemplary metals include stainless steel, titanium and aluminum alloys. The present invention is particularly useful for honeycomb made from composite materials which tend to have maximum operating temperatures that are much lower than metals and ceramics. Exemplary composite materials include fiberglass, Nomex and various combinations of graphite or ceramic fibers with suitable matrix resins. Matrix resins that can withstand relatively high temperatures (450° F. to 650° F.) are preferred. For example, when the matrix resin is polyimide, the maximum operating temperature for the honeycomb is on the order of 500° F. to 650° F. Composite honeycomb in which the matrix resin is a high-performance epoxy typically have a much lower maximum operating temperature on the order of 350° F. to 400° F. It is preferred that the heat transfer into the honeycomb be regulated such that the temperature of the honeycomb remains at a level that is equal to or less than the maximum operating temperature of the matrix resin.

The desired reduction in temperature between the high temperature area and the second edge of the honeycomb will vary depending upon the highest operating temperature of the hot section and the maximum operating temperature of the honeycomb resin. The larger the difference between the two temperatures, the greater the amount of thermal regulation that must be designed into the insulating septums and heat blanket, if required. In general, the type of material used to make the insulating septums as well as the thickness and location of the septums should provide a steady-state reduction in temperature of at least 225° F. Steady-state temperature reductions of at least 375° F. are typically needed for hot sections operating in the higher temperature ranges of 750° F. to 900° F.

As an example, if the operating temperature of the high temperature area is 700° F. and the maximum operating temperature of the honeycomb matrix resin is 450° F., then the insulating septums are chosen such that a steady-state temperature of the honeycomb is obtained that is at least 250° F. below the operating temperature of the hot section or high temperature area. In some instances it may be desired to achieve the required 250° F. drop in temperature using only insulating septums. Optionally, a thermal blanket or other external thermal insulator may be used to provide a portion of the required heat regulation.

Figure 5:
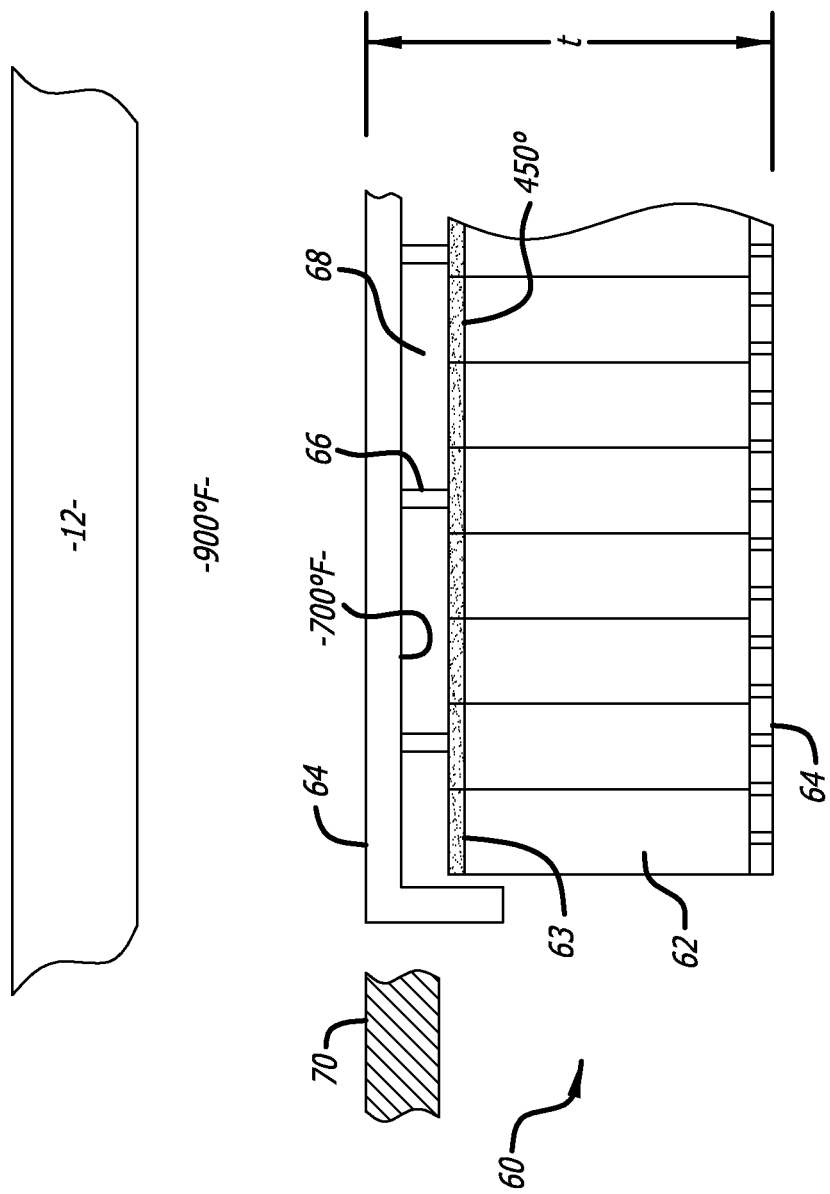
FIG. 5 is a simplified depiction of a portion of an exemplary preferred acoustic structure that includes internal thermal regulators in accordance with the present invention and which additionally includes an external thermal blanket. This exemplary preferred acoustic structure is intended for use in next generation large jet engines that have hot sections that operate at temperatures up to 900° F. and higher.

A preferred exemplary embodiment of a thermally regulated acoustic structure in accordance with the present invention is shown at 60 in FIG. 5. The acoustic structure 60 includes an acoustic honeycomb 62 which includes internally located thermally insulating septums 63. The acoustic honeycomb 62 is used in combination with an external thermal insulator, such as thermal or heat blanket 64. The thermal blanket is spaced from the edge of the honeycomb 62 using spacers 66 in order to form a thermally insulating chamber 68. The thermally insulating chamber 68 may be formed using spacers 66 to keep the heat blanket 64 spaced away from the acoustic honeycomb 62 or any other type of connection structure may be used provided that the heat blanket 64 is securely attached to the acoustic honeycomb 62 in such a way that a space or chamber is formed between the heat blanket 64 and the acoustic honeycomb 62.

The acoustic structure 60 has a honeycomb matrix resin that has an exemplary maximum operating temperature of 450° F. The acoustic structure is designed to be used near exemplary hot sections that operate at temperatures as high as 900° F. As shown in FIG. 5, the heat blanket 64 has a thickness and weight that are designed to regulate heat flow such that the temperature on the low temperature side (inside) of the heat blanket is 200° F. below the hot section side (outside) of the heat blanket. The combination of the air gap or thermally insulating chamber 68 and the thermally insulating septums 63 provides further heat regulation such that the temperature on the low temperature side of the insulating septums is 250° F. below the temperature on the inside of the heat blanket.

In a conventional thermally protected acoustic system, the acoustic structure would be protected only by a heat blanket, as shown at 70. The heat blanket 70, by itself, would have to be sufficiently thick and heavy to provide the desired heat regulation from 900° F. down to 450° F. Such a structure (acoustic honeycomb+heat blanket) would have a thickness represented by "t". As shown in FIG. 5, the present invention uses thermally insulating septums to provide a design variable where the thickness and weight of the heat blanket is substantially reduced while maintaining the same thickness (t) of the overall structure. This design variable allows one to replace a portion of the heat blanket with a thermally insulating chamber 68 that is much lighter than the heat blanket. Although the air gap or thermally insulating chamber is not as thermally insulating as the portion of the heat blanket that it replaces, the combination of the air gap and internally located insulating septums provide the same degree of heat regulation at a much lighter weight.

The acoustic structure 60 shown in FIG. 5, where the heat blanket 64 is separated from the acoustic honeycomb 62 by an air gap 68, is only exemplary. If desired, the acoustic structure 62 may be placed directly in contact with the thermal blanket 64. This may be desirable in those situations where the thickness (t) of the thermally protected acoustic structure 60 is to be kept at a minimum to meet design requirements.

The thickness of the insulating septums 38a-38d and the material used to form the insulating septums can be varied in order to provide desired levels of insulation and heat regulation so that the temperature of the honeycomb remains below the maximum operating temperature of the honeycomb, as described above. It is not necessary that the insulating septums function as a heat blanket or other thermal blocking structure that completely insulates the honeycomb from heat. Instead, the insulating septums are intended to regulate the amount of heat transferred into the honeycomb cells so that the temperature within the honeycomb remains below levels that could be potentially destructive to the honeycomb.

The thermally insulating septums 38a-38d can be made from any suitable insulating material that provides the necessary heat regulation or insulation between the hot side 24 of the acoustic structure and the cool side 26 of the acoustic structure. As a feature of the invention, the insulating septums are located within the honeycomb cells to provide an "in-core" heat regulation system as opposed to an exterior system, such as an insulating blanket or sheet. The thermally insulating septums are preferably made from hollow ceramic or glass high temperature insulating microspheres that held together by a matrix of high temperature resin. They may also be made from combinations of high temperature insulating fibers in a matrix of high temperature resin or a low conductivity ceramic material in a foamed resin matrix.

The hollow ceramic microspheres are typically made from glass, alumina, titanium dioxide, iron oxide and fly ash. The hollow microspheres can have diameters that range in size from 50 microns to 250 microns. Exemplary hollow microspheres are described in published United States Patent Appl. No. US 2010/0107611 A1, the contents of which are hereby incorporated by reference. The microspheres are preferably combined with uncured high temperature resin to form a viscous material that is formed into a layer into which the first edge of the honeycomb is dipped. The thickness of the viscous layer determines the thickness of the thermally insulating septums that are formed when the matrix resin is subsequently cured. Alternatively, a layer of insulating material may be formed and then "cookie-cut" into the honeycomb cells using the edge of the core to cut through the insulating material. In addition, the insulating septums may be preformed and then inserted into the honeycomb cells where they are friction fit and/or glued in place.

The amount of high temperature matrix resin is chosen so that only the minimum amount of matrix resin is present to provide adequate agglomeration of the microspheres and adherence to the honeycomb walls. Exemplary high temperature matrix resins for the hollow ceramic microspheres include polyimide resins, such as Skybond 700 and 705, which are available from Industrial Summit Technology Corporation (Parkin, N.J.) or Unitech RP46 and RP50, which are available from Unitech Corporation (Arlington, Va.). Typically, the hollow ceramic microsphere will make up from 85 to 95 weight percent of the viscous material used to form the insulating septums with the remainder of the material being the matrix resin. After the honeycomb has been inserted into the viscous layer of insulating material, the resin matrix is cured according to standard procedures for the particular matrix resin to form the insulating septum. The insulating septum is held in place by adhesion between the matrix resin and the honeycomb walls. The insulating septum is essentially a disk of closely packed hollow ceramic microspheres that are held together and held in place within the honeycomb by the high temperature resin matrix.

The insulating septums may be formed such that all of the honeycomb cells contain insulating septums made from the same layer of microsphere insulating material. Alternatively, one or more cells may be selectively plugged with foam wax or other removable material. After formation of the first set of insulating septums, the first set of septums is covered and additional insulating septums can be formed in the previously plugged cells. This type of selective plugging and/or protection of the honeycomb cells allows one to make an acoustic structure that contains insulating septums that are made from different insulating materials and which have different thicknesses.

The acoustic septums 40a-40c can be made from any of the standard acoustic materials used it to provide noise attenuation including woven fibers and perforated sheets. The use of the woven fiber acoustic septums is preferred. These acoustic materials are typically provided as relatively thin sheets of an open mesh fabric that are specifically designed to provide noise attenuation. It is preferred that the acoustic material be an open mesh fabric that is woven from monofilament fibers. The fibers may be composed of glass, carbon, ceramic or polymers. Monofilament polymer fibers made from polyamide, polyester, polyethylene chlorotrifluoroethylene (ECTFE), ethylene tetrafluoroethylene (ETFE), polytetrafluoroethyloene (PTFE), polyphenylene sulfide (PPS), polyfluoroethylene propylene (FEP), polyether ether ketone (PEEK), polyamide 6 (Nylon 6, PA6) and polyamide 12 (Nylon 12, PA12) are just a few examples. Open mesh fabric made from PEEK is preferred for high temperature applications, such as nacelles for jet engines. Exemplary septums are described in U.S. Pat. Nos. 7,434,659; 7,510,052 and 7,854,298, the contents of which are hereby incorporated by reference. Septums made by laser drilling plastic sheets or films may also be used.

The solid protective sheet 42 is preferably a high temperature nonmetallic skin that is able to withstand relatively high temperatures on the order of 600° F. to 900° F. The material is preferably, but not necessarily, thermally insulating. The protective sheet is intended to protect the honeycomb structure from direct contact with the hot gases formed in the hot section 12. The protective sheet may be eliminated, as shown in FIG. 5, when an external insulator, such as a heat blanket or insulator is used. Any of the materials normally used to protect underlying structures from hot gases may be used to form the solid protective sheet.

It is preferred that a heat blanket be used in combination with the thermally regulated acoustic honeycomb. The hot engine temperatures are blocked first by the insulation or heat blanket which also provides physical protection of the acoustic honeycomb from potentially abrasive gases. In addition to reducing the temperature and protecting underlying structures, the insulation blanket can also be removed to check the acoustic bypass duct. The acoustic bypass duct structure is inspected to confirm it has not seen excess temperatures which would affect structural integrity. The insulation blankets are also inspected and/or replaced during this periodic inspection.

The material used to make the perforated acoustic panel 44 can be any of the materials commonly used for such porous acoustic structures provided that the pores or perforations in the structure are sufficient to allow the sound waves from the jet engine or other source to enter into the acoustic cells or resonators.

In general, the honeycomb cells will typically have a cross-sectional area ranging from 0.05 square inch to 1 square inch or more. The depth of the cells (honeycomb thickness or core thickness "T" in FIG. 2) will generally range from 0.25 to 3 inches or more. For honeycomb used in acoustic structures 22 that are located adjacent to the hot section 12 of a jet engine, the honeycomb cells will typically have a cross-sectional area of between about 0.1 to 0.5 square inch and a thickness (T) of between about 1.0 and 2.0 inches.

As mentioned above, additional difunctional material 48 can be added to the honeycomb cells either alone, as shown at 48c in FIG. 2 or between the acoustic septum and the thermally insulating septum, as shown at 48a and 48b. The additional insulating material is preferably a difunctional material. This means that the material not only provides additional thermal insulation, but also provides some degree of sound attenuation. Exemplary difunctional materials include spun fibers, such as glass fibers or high temperature foams. The type, amount and location of the additional difunctional material may be varied widely within the honeycomb cells to achieve an equally wide variety of thermal regulation and noise attenuation objectives.

The acoustic structure of the present invention provides a number of advantages which include a substantial reduction in the amount of heat flow from the high temperature side of the acoustic structure to the low temperature side. This can reduce or eliminate the need for a separate external heat shield. In addition, one can form different sizes and types of insulating septums inside of the honeycomb cells in order to fine tune and carefully regulate the amount of heat that flows through various parts of the honeycomb.

The heat flow control or regulation feature provided by the internal insulating septums works well in combination with the acoustic septums that are also located in the honeycomb cells. The insulating septums provide thermal protection for the acoustic septums, which like the honeycomb tend to fail at temperatures well below the hot section operating temperatures. The present invention provides a number of advantages, as described above, that can only be obtained by the unique combination of septums described herein where internally located septums provide both thermal protection and sound attenuation.

It should be noted that the operating temperatures for the hot sections and the maximum operating temperatures for the honeycomb matrix resin are exemplary only. The present invention may be applied to a wide range of noise damping situations where it is necessary to achieve effective heat protection using a minimum amount of weight and space. The present invention moves at least a portion of the heat protection system into the honeycomb by providing internal insulating septums. The use of internal insulating septums alone or in combination with an external heat protective structure provides an effective way to minimize the weight and size of the overall heat-protected acoustic structure, especially with respect to next generation jet engines that operate at relatively high temperatures.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An acoustic structure having an internal thermal regulator, said acoustic structure comprising:
   a honeycomb comprising a first edge that is to be located closest to a high temperature area and a second edge, said honeycomb comprising a cell defined by a plurality of walls that extend between said first and second edges;
   a thermally insulating septum located within said cell adjacent to the first edge of said honeycomb to provide said internal thermal regulator, said thermally insulating septum comprising sides which are attached to the walls of said cell;
   an acoustic damping material located within said cell between said thermally insulating septum and said second edge; and
   a perforated acoustic panel attached to the second edge of said honeycomb wherein sound waves can enter said cell through said perforated acoustic panel.

2. An acoustic structure according to claim 1 which further comprises a solid protective sheet which is attached to the first edge of said honeycomb.

3. An acoustic structure according to claim 1 wherein said acoustic damping material is an acoustic septum.

4. An acoustic structure according to claim 1 wherein said acoustic damping material is difunctional filler material that provides both thermal insulation and sound attenuation within said cell.

5. An acoustic structure according to claim 1 which further includes a thermal insulation structure located between the first edge of said honeycomb and said high temperature area.

6. An acoustic structure according to claim 5 wherein an air gap is located between said thermal insulation structure and the first edge of said honeycomb.

7. An acoustic structure according to claim 1 wherein said honeycomb walls comprise fibers and a cured resin.

8. A jet engine that comprises an acoustic structure according to claim 1.

9. A jet engine that comprises an acoustic structure according to claim 5 and wherein said jet engine comprises a high temperature area having a temperature of between 750° F. and 900° F.

10. A method for making an acoustic structure having an internal thermal regulator, said method comprising the steps of:
    providing a honeycomb comprising a first edge that is to be located closest to a high temperature area and a second edge, said honeycomb comprising a cell defined by a plurality of walls that extend between said first and second edges;
    locating a thermally insulating septum within said cell adjacent to the first edge of said honeycomb to provide said internal thermal regulator, said thermally insulating septum comprising sides which are attached to the walls of said cell;
    locating an acoustic damping material within said cell between said thermally insulating septum and said second edge; and
    attaching a perforated acoustic panel to the second edge of said honeycomb wherein sound waves can enter said cell through said perforated acoustic panel.

11. A method for making an acoustic structure according to claim 10 which includes the additional step of attaching a solid protective sheet to the first edge of said honeycomb.

12. A method for making an acoustic structure according to claim 10 wherein said acoustic damping material is an acoustic septum.

13. A method for making an acoustic structure according to claim 10 wherein said acoustic damping material is a difunctional filler material that provides both thermal insulation and sound attenuation within said cell.

14. A method for making an acoustic structure according to claim 10 which further includes the additional step of locating a thermal insulation structure adjacent to the first edge of said honeycomb.

15. A method for making an acoustic structure according to claim 14 wherein said thermal insulation structure is located adjacent to the first edge of said honeycomb such that an air gap is located between said thermal insulation structure and the first edge of said honeycomb.

16. A method for making an acoustic structure according to claim 10 wherein said honeycomb walls comprise fibers and a cured resin.

17. A method for providing thermal insulating and sound dampening for a jet engine that comprises a high temperature area, said method comprising the step of locating an acoustic structure having an internal thermal regulator according to claim 1 adjacent to said high temperature area.

18. A method for providing thermal insulating and sound dampening for a jet engine that comprises a high temperature area, said method comprising the step of locating an acoustic structure having an internal thermal regulator according to claim 5 adjacent to said high temperature area.

19. An acoustic structure according to claim 1 wherein said thermally insulating septum comprises hollow microspheres and a matrix of resin.

20. An acoustic structure according to claim 19 wherein said matrix of resin comprises polyimide resin.

* * * * *